United States Patent [19]

Treadwell

[11] 4,244,241
[45] Jan. 13, 1981

[54] FINAL DRIVE UNITS FOR MOTOR VEHICLES

[75] Inventor: Alan F. Treadwell, Coventry, England

[73] Assignee: Chrysler United Kingdom Limited, London, England

[21] Appl. No.: 948,746

[22] Filed: Oct. 5, 1978

Related U.S. Application Data

[63] Continuation of Ser. No. 726048, Sep. 23, 1976.

[30] Foreign Application Priority Data

Oct. 7, 1975 [GB] United Kingdom ............... 41060/75

[51] Int. Cl.³ .......................... F16H 37/08; F16H 1/38
[52] U.S. Cl. ...................................... 74/695; 74/710; 74/714
[58] Field of Search .................... 74/695, 710, 710.5, 74/711, 713, 714, 715; 308/207 R, 210, 211

[56] References Cited

U.S. PATENT DOCUMENTS

| | | | |
|---|---|---|---|
| 2,046,282 | 6/1936 | Wert | 74/695 |
| 2,068,438 | 1/1937 | Starr | 74/695 |
| 2,651,215 | 9/1953 | Schoenrock | 74/714 X |

*Primary Examiner*—C. J. Husar
*Assistant Examiner*—Frank McKenzie
*Attorney, Agent, or Firm*—Mawhinney & Mawhinney & Connors

[57] ABSTRACT

The disclosure relates to a final drive unit for a motor vehicle in which a differential has a rotatable planet wheel carrier formed with hollow axial extensions on both sides thereof through which the output drives extend. One of the extensions is supported for rotation of the planet wheel carrier in a first bearing and an input ring gear is secured to the other extension. The input ring gear is supported directly on a bearing mounted on a carrier.

5 Claims, 2 Drawing Figures

FINAL DRIVE UNITS FOR MOTOR VEHICLES

This is a continuation of application Ser. No. 726,048 filed Sept. 23, 1976.

BACKGROUND OF THE INVENTION

1. Field of the Invention

The invention relates to final drive units for motor vehicles and is particularly although not exclusively applicable to final drive units for transverse mounted engines having a gear box and final drive unit combined in a single assembly.

2. Description of the Prior Art

The final drive unit used in the Fiat 127 as described in the U.K. Magazine "Motor" of Apr. 17th 1971 and the final drive unit used in the Fiat 128 and 130 as described in the U.K. Magazine "Automobile Engineer" of January 1971 both support the final drive gear through a number of assembled components and at a distance from the final drive gear which can produce play or flexing of the gear resulting in variations in meshing and consequently extra gear noise.

In general in front wheel drive vehicles with transversely mounted engines, the final drive unit is usually closer to one driving wheel of the vehicle than the other. It is therefore desirable to make the driving shaft on the side closest to the driving wheel as long as possible to restrict the angular movement of that shaft.

The object of the present invention is to reduce the possibility or flexing or play in the final drive gear and also to provide an arrangement in which the driving shaft on the side of the assembly closest to a driving wheel can be made as long as possible.

SUMMARY OF THE INVENTION

The invention provides a final drive unit for a motor vehicle comprising a differential having a rotatable planet wheel carrier formed with a hollow axial extension on both sides thereof through which output drives may extend, a first bearing supporting one of said extensions for rotation, an input ring gear secured to the other extension having a fixed hollow bearing carrier concentric with the first bearing, and a second bearing mounted on the bearing carrier and supporting the ring gear for rotation.

Since the final drive gear is supported directly on a bearing any radial movement of the gear is minimised so that meshing of the gear is more closely controlled than hitherto and this results in a quieter running gear. Also since the final drive gear is supported directly in a bearing this permits an arrangement in which the centre of the drive shaft universal joint on the side closest to the vehicle wheel to be located inboard of a central plane through the final drive gear thus increasing the length of the drive shaft to reduce the angular movement thereof.

DESCRIPTION OF THE PREFERRED EMBODIMENT

Figure 1:
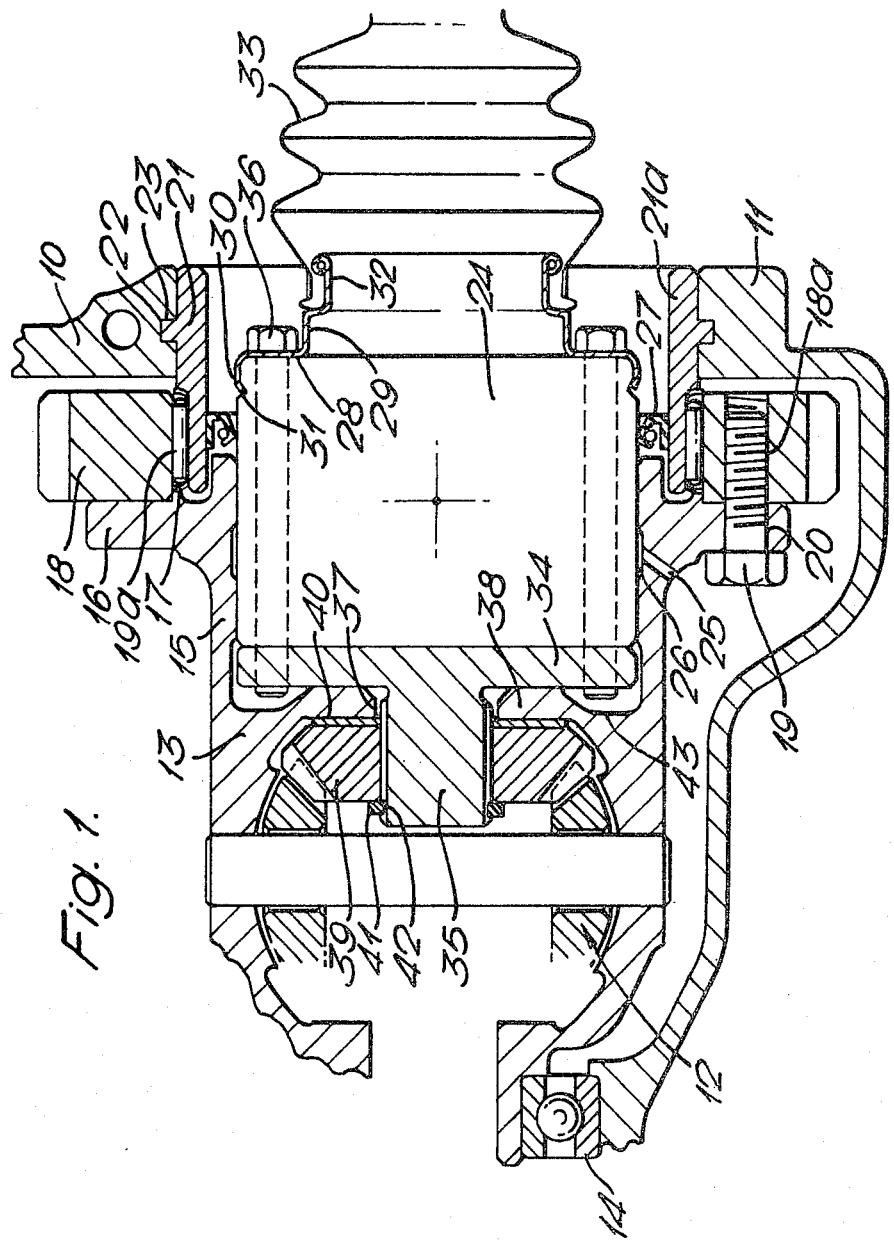
FIG. 1 is a sectional view of part of a transverse engine transmission unit.

A final drive arrangement for a front wheel driven vehicle having an engine and transmission located transversely in the vehicle comprises a transmission housing 10 to which is secured a casing 11 within which there is a differential unit 12 itself enclosed within a housing 13. The axis of the differential unit is parallel to and spaced from the engine crankshaft axis (not shown).

One end of the housing 12 is rotatably supported by a bearing 14 mounted within the end of the casing 11, the bearing being capable of withstanding axial thrust in opposite directions. The other end of the housing 13 has an integral hollow cylindrical extension 15 which is coaxial with the differential unit.

The extension has an outwardly directed flange 16 close to the end thereof remote from the housing 13. The flange has an annular spigot 17 on the side thereof remote from the housing, the spigot being co-axial with the differential unit and spaced from the periphery thereof. A relatively large diameter annular gear wheel 18 engages around the spigot 17 and is secured to the flange 16 by a plurality of screws 19 passing through holes 20 in the flange and screwed into threaded holes 18a in the gear 18.

The teeth on the outer periphery of the gear 18 are of helical form and are in mesh with an intermediate gear (not shown) which transmits the drive from the engine via the transmission unit (not shown) which may be of the automatic variety.

The spigot 17 extends only partway into the bore of the gear 18 and the remaining part of the bore receives and is supported for rotation by a needle roller bearing 19a mounted on a reduced diameter portion at one end of an annular cylindrical member 21, the other end 21a of which is securely clamped between the corresponding part-cylindrical faces of two recesses formed respectively in the transmission housing 10 and one end of the casing 11 such that the member 21 is co-axial with the differential housing axis 13. Axial movement of the member 21 is prevented by an outwardly direct circumferential square section flange 22 on member 21 which engages in a corresponding groove 23 in the housing 10 and casing 11. Rotation of the member 21 relative to the housing 10 and casing 11 may be prevented by a suitable adhesive between the mating faces of the member, housing and casing which may also act as a sealant therebetween.

The end of the annular extension 15 remote from the differential unit extends with clearance into the bore of the member 21 at the reduced diameter portion end thereof to provide a suitable width of bearing surface in the bore of the annular extension for rotatably supporting the cylindrical housing 24 of a torque-transmitting universal joint (not shown) connecting one side of the differential unit to one vehicle wheel drive shaft and the other side of the differential unit is connected through a universal joint to another vehicle wheel drive shaft. At least one passage 25 in the extension connects the exterior of the annular extension with a shallow circumferential recess 26 in the bore of the extension intermediate the ends of the bearing surface to provide a path for lubricant thereto and an annular oil seal 27 is located in the bore of the cylindrical member 21a adjacent the open end of the annular extension to prevent the egress of lubricant from between the bore of the member 21a and the peripheral surface of the joint housing 24.

Sealing means between said one end of the joint housing and the drive shaft is provided by a metal annular end cap 28 having oppositely directed inner and outer peripheral flanges 29 and 30 respectively, the outer flange 30 closely engaging over the said one end of the joint housing 24 and secured thereto by spinning the end of the flange into a circumferential groove 31 in the outer peripheral surface of the housing whilst the end of the inner flange 29 is stepped inwardly to provide a shallow channel 32 into which engages the end of a flexible convoluted bellows seal 33 whilst the other end of the seal engages over the drive shaft.

The universal joint housing 24 is connected to the differential unit 13 by a carrier element comprising a base 34 and an integral centrally located axially extending splined shaft 35. The base is secured to the joint housing by a plurality of circumferentially spaced axially directed bolts 36 passing through corresponding holes in the end caps 28 and the joint housing 24 and the screwed ends of the bolts are screwed into holes in the base 34. The base is located accurately on the end of the joint housing by a spigot or dowels (not shown) to ensure co-axial alignment of the axes of the differential housing 13. The splined shaft 35 extends into the differential housing through a clearance hole 37 in the wall 38 of the housing and engages in one of the differential bevel drive gears 39 having a correspondingly splined bore to receive the shaft 35 and is thus held fast for rotation therewith. A thrust washer 40 is interposed between the inside face of the differential housing wall and the bore of the bevel gear 39 which is retained on the splined shaft 35 by a circlip 41 engaged into a circumferential groove 42 in the shaft 35 adjacent the end thereof. The outside face of the wall 38 may have an axially facing annular recess 43 to provide clearance for the screwed ends of the bolts 36.

From the foregoing therefore, it can be seen that supporting the final drive gear wheel 18 by the needle roller bearing 19a as shown effectively eliminates overhung loads on the differential-housing as well as providing support means of greater rigidity than hitherto which thus provides quieter running of the final drive gear. The construction also provides a particularly advantageous spatial arrangement in cases where the final drive and differential is located offset from the vehicle longitudinal axis by permitting the use of a longer drive shaft from the end of the differential unit which is nearer to the vehicle frame than would be permissible with more orthodox arrangements.

It will also be appreciated that the remaining component parts of the differential unit 12 may be of known construction, although it will also be appreciated that various modifications may be made to the embodiment described hereinbefore without departing from the scope of the invention. For example, in cases where the differential unit is offset from the vehicle longitudinal axis, an extension housing may be secured to the end of casing 11 in which the single combined journal and thrust bearing 14 is located to provide substantially equal lengths of drive shafts, the bearing 14 being mounted within this extension if desired. Also, whilst the carrier element and universal joint housing are shown as separate and dismountable components in the embodiment described hereinbefore, they may be constructed together as an integral unit.

Figure 2:
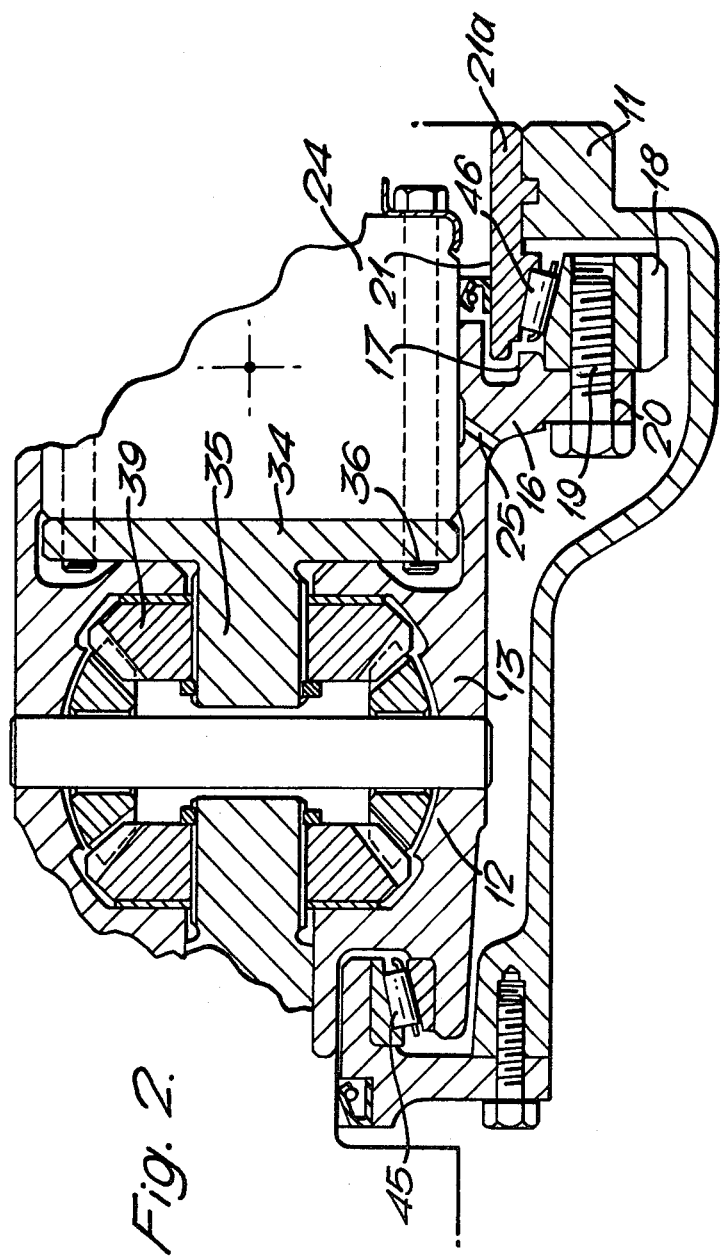
FIG. 2 is a similar view of an alternative construction.

A further embodiment of the invention is illustrated in FIG. 2 of the drawings to which reference will now be made. The arrangement is generally similar to that of FIG. 1 and like parts have been alloted the same reference numerals. In the arrangement of FIG. 2 the bearings 14 and 19a have been replaced by oppositely acting tapered roller bearings 45 and 46, the latter supporting the ring gear 18 for rotation and the two bearings together supporting the differential unit 13 for rotation and against axial movement in the housing/casing 10/12.

I claim:

1. A final drive unit for a motor vehicle comprising a differential having a rotatable planet wheel carrier formed with a hollow extension on each side thereof through which output drives may extend, a first bearing supporting one of said extensions for rotation, an input ring gear having an side face which abuts and is secured to the other extension, the input ring gear having an inner surface which forms one surface of a bearing race, a fixed hollow bearing carrier coaxial with the first bearing and extending concentrically within the ring gear, that part of the bearing carrier located within the ring gear having an outer surface forming a second bearing race and roller bearing elements disposed between the outer bearing race of the ring gear and the inner bearing race of the bearing carrier providing a second bearing which supports the ring gear concentrically with the bearing carrier for rotation.

2. A final drive unit as claimed in claim 1 wherein said other extension has an encircling outwardly extending flange adjacent the end thereof remote from the differential and said side face of the input ring gear is secured to the side of the flange remote from the differential.

3. A final drive unit as claimed in claim 2 wherein the flange has an annular axially extending spigot which engages in the inner surface of the ring gear adjacent the bearing race to locate the ring gear with respect to the flange.

4. A final drive unit as claimed in claim 1 wherein the roller bearing elements of the second bearing between the bearing race around the bearing carrier and the bearing race in the ring gear are cylindrical rollers.

5. A final drive unit as claimed in claim 1 wherein said first bearing incorporates tapered rollers arranged to resist axial movement of the planet wheel carrier in one direction and the roller bearing elements of the second bearing are tapered rollers arranged to resist axial movement of the planet wheel carrier in the opposite direction.

* * * * *